(12) United States Patent
Yamamoto et al.

(10) Patent No.: US 9,658,809 B2
(45) Date of Patent: May 23, 2017

(54) PRINTING SYSTEM, PRINTING CONTROL METHOD IN CLUSTER ENVIRONMENT, AND PRINTING CONTROL PROGRAM

(71) Applicant: WingArc1st Inc., Tokyo (JP)

(72) Inventors: Takahiro Yamamoto, Tokyo (JP); Masatoshi Tanaka, Tokyo (JP); Ko Shimazawa, Tokyo (JP); Takahiro Sakimoto, Tokyo (JP)

(73) Assignee: WINGARC1ST INC., Tokyo (JP)

( * ) Notice: Subject to any disclaimer, the term of this patent is extended or adjusted under 35 U.S.C. 154(b) by 0 days.

(21) Appl. No.: 15/216,803

(22) Filed: Jul. 22, 2016

(65) Prior Publication Data

US 2016/0328192 A1 Nov. 10, 2016

Related U.S. Application Data

(62) Division of application No. 14/787,109, filed as application No. PCT/JP2014/080852 on Nov. 21, 2014.

(30) Foreign Application Priority Data

Jan. 22, 2014 (JP) .................................. 2014-009790

(51) Int. Cl.
*G06F 3/12* (2006.01)
*B41J 29/38* (2006.01)

(52) U.S. Cl.
CPC ............ *G06F 3/1259* (2013.01); *B41J 29/38* (2013.01); *G06F 3/121* (2013.01); *G06F 3/1204* (2013.01);

(Continued)

(58) Field of Classification Search
None
See application file for complete search history.

(56) References Cited

U.S. PATENT DOCUMENTS

| 8,553,255 | B2* | 10/2013 | Shirai ................... G06F 3/1204 358/1.13 |
| 2003/0128384 | A1* | 7/2003 | Nelson ................. G06F 3/1217 358/1.15 |

(Continued)

FOREIGN PATENT DOCUMENTS

| JP | H09-231025 A | 9/1997 |
| JP | 2005-173919 A | 6/2005 |

(Continued)

*Primary Examiner* — Dung Tran
(74) *Attorney, Agent, or Firm* — Polsinelli PC

(57) ABSTRACT

A print job is submitted from a client terminal 100 to two print servers $200_{-1}$, $200_{-2}$, a print server taking main charge $200_{-1}$ instructs a printer 300 to print one page at a time in sequence, and status information indicating the printing state is shared by the two print servers $200_{-1}$, $200_{-2}$. If a failure occurs in the print server taking main charge $200_{-1}$, then, on the basis of the status information shared by the two print servers $200_{-1}$, $200_{-2}$, a print server taking sub charge $200_{-2}$ instructs the printer 300 to print in accordance with the submitted print job from the unprinted page. This makes it possible to immediately continue the print from the page indicated to be completely printed when the failure occurred.

4 Claims, 11 Drawing Sheets

(52) U.S. Cl.
CPC ............ *G06F 3/126* (2013.01); *G06F 3/1213* (2013.01); *G06F 3/1261* (2013.01); *G06F 3/1267* (2013.01); *G06F 3/1268* (2013.01); *G06F 3/1288* (2013.01)

(56) References Cited

U.S. PATENT DOCUMENTS

| | | | |
|---|---|---|---|
| 2009/0225360 A1* | 9/2009 | Shirai | G06F 3/1204 358/1.15 |
| 2011/0063665 A1* | 3/2011 | Hirakawa | G06F 3/121 358/1.15 |
| 2015/0293734 A1* | 10/2015 | Shirai | G06F 3/121 358/1.15 |
| 2016/0011820 A1* | 1/2016 | Shimazawa | B41J 29/38 358/1.14 |

FOREIGN PATENT DOCUMENTS

| | | |
|---|---|---|
| JP | 2006-243884 A | 9/2006 |
| JP | 2007-062059 A | 3/2007 |
| JP | 2008-186270 A | 8/2008 |
| JP | 2009-151470 A | 7/2009 |
| JP | 2010-176595 A | 8/2010 |
| JP | 2013-008301 A | 1/2013 |

\* cited by examiner

PRINTING SYSTEM, PRINTING CONTROL METHOD IN CLUSTER ENVIRONMENT, AND PRINTING CONTROL PROGRAM

CROSS REFERENCE TO RELATED APPLICATIONS

This application is a Divisional filing and claims priority under 35 U.S.C. §121 of application Ser. No. 14/787,109 filed on Oct. 26, 2015 which is a National Phase filing under 35 U.S.C. §371 of PCT/JP2014/080852 filed on Nov. 21, 2014; and this application claims priority to Application No. 2014-009790 filed on Jan. 22, 2014 under 35 U.S.C. §119. The entire contents of each application are hereby incorporated by reference.

TECHNICAL FIELD

The present invention relates to a printing system, a printing control method in a cluster environment, and a printing control program, and more particularly, is suitably used for a printing system in a cluster environment which has a plurality of print servers.

BACKGROUND ART

Conventionally, there is provided a printing system having a plurality of print servers clustered (for example, see Patent Document 1). In the printing system of this type, when a trouble is caused by one of the print servers, a backup print server takes over and executes a print job managed by the print server causing the trouble.

Referring to the print control device described in the Patent Document 1, when another print server takes over print job information of the print server which goes down, it is decided whether a status of the print job information is a takeover target. If it is decided that the status is the takeover target, the print job information decided to be the takeover target is added to a job list held by the print server.

Specifically, it is decided whether the status is the takeover target from the following three viewpoints.

If the print server goes down in a transfer state from a spool, transfer to a print device has not been carried out. For this reason, the takeover is not performed.

A job executing interruption after the transfer has already been transmitted to the print device and there is a possibility that discharge of a paper might have been started. For this reason, job tracking is taken over to confirm completion, thereby preventing double printing.

If the print job has already been completed or ended due to an error, the status is not set to be the takeover target.

There is also provided a printing system which clusters a plurality of printers and performs proxy printing by another printer when a failure occurs in a printer which is being used (for example, see Patent Documents 2 and 3). Referring to the network managing device described in the Patent Document 2, when a failure occurs in a printer which is executing print processing based on an input print job, a proxy print job configured from print data which was not printed by the printer causing the failure and a control code of the print data is created based on failure occurrence information from which a notice is given from the printer to a print server, and the proxy print job thus created is output to a proxy printer.

Referring to the distribution processing system for a print job described in the Patent Document 3, moreover, when an error occurs in a partner printer, continuation of printing is stopped until the error is eliminated by one of printers making a pair. Then, a noted distribution destination printer receives unprinted page information from a printer controller, and furthermore, receives a distribution job stored in a printer buffer, changes control data on the distribution job, and generates an unexecuted job requiring for printing an unprinted page and supplies the unexecuted job to the partner printer.

Patent Document 1: Japanese Laid-Open Patent Publication No. 2009-151470
Patent Document 2: Japanese Laid-Open Patent Publication No. 1997-231025
Patent Document 3: Japanese Laid-Open Patent Publication No. 2007-62059

In the case in which a plurality of print servers or a plurality of printers is clustered to build a printing system, continuous execution is demanded without stopping the printing when a failure occurs in any of the print servers or printers. In the case in which a failure occurs during execution of a print job for a plurality of pages so that another print server or printer takes over the print job, moreover, it is also demanded to prevent double print of the same page from being caused by performing the print job again from the beginning.

In contrast, according to the system described in the Patent Document 1, there is provided a function for preventing double printing when another print server takes over a print job of a print server which goes down. However, this function serves to prevent the double printing by taking over tracking of the print job to confirm completion in the case in which the print job has already been transmitted to a print device. On the other hand, the takeover is not performed when the print server goes down in a transfer state from a spool. For this reason, there is a problem in that the print might be stopped.

Also in the systems described in the Patent Documents 2 and 3, furthermore, when a failure occurs in a printer which is performing print, a print job for giving an instruction for printing an unprinted page is generated to carry out proxy print by another printer so that the same page can be prevented from being subjected to double printing. However, the systems described in the Patent Documents 2 and 3 need to generate a print job for an unprinted page when performing the takeover. For this reason, there is a problem in that the print is stopped temporarily. By exactly taking over an original print job by another printer, it is possible to shorten a stoppage time for the print. However, the double printing cannot be avoided.

DISCLOSURE OF THE INVENTION

The present invention has been made in order to solve the problems and has an object to enable a reduction in a stoppage time during which another print server or printer takes over a print job to continuously execute print and avoidance of double printing when a failure occurs in a print server or a printer which is executing print jobs for a plurality of pages in a printing system in a cluster environment.

In order to attain the object, in the present invention, a print job generated in a client terminal is submitted into at least two print servers, and an instruction for executing print through the print job for all pages is given to a printer in one of the printer servers. At this time, the printer executes the print from a first page, and generates status information indicating which pages have been completely printed and stores the status information in an internal memory. When occurrence of a failure in the print server which is executing the print is detected, thereafter, an instruction for executing print through a print job for all pages is given to the printer in another print server from the print server having the failure occurrence. At this time, the printer discards pages intended to be completely printed through the status information stored in the internal memory and executes the print from a next unprinted page.

According to the present invention having the structure described above, when the failure occurs in the print server which is executing the print job for a plurality of pages in the printing system in a cluster environment having a plurality of print servers, the another print server which takes over the print job sufficiently transmits the print job, as it is, which has already been submitted from the client terminal to the printer, thereby giving an instruction for executing the print. At the printer side, thereafter, it is possible to skip the printed pages, thereby executing the print from the unprinted page. When the another print server takes over the print job depending on the occurrence of the failure, consequently, it is possible to continuously execute the print by shortening a temporary stoppage time and to avoid double printing without newly generating the print job for the unprinted page.

BEST MODE FOR CARRYING OUT THE INVENTION (First Embodiment)

Figure 1:
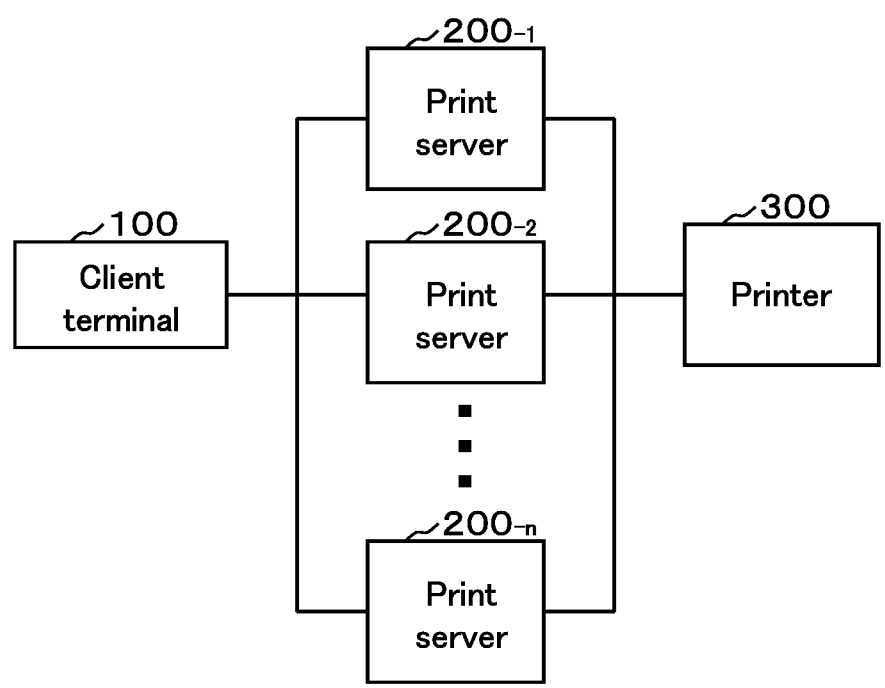
FIG. 1 is a diagram showing an example of a structure of a printing system according to a first embodiment.

A first embodiment of the present invention will be described below with reference to the drawings. FIG. 1 is a diagram showing an example of a structure of a printing system according to a first embodiment. As shown in FIG. 1, the printing system according to the first embodiment is a printing system in a cluster environment having a plurality of print servers and is configured from a client terminal 100, n print servers $200_{-1}, 200_{-2}, \ldots, 200_{-n}$ (hereinafter referred to as a print server 200), and a printer 300.

The client terminal 100 and the print servers 200, the printer servers 200, and the print servers 200 and the printer 300 are connected through communication networks, respectively. The communication network may be an LAN (Local Area Network) or a WAN (Wide Area Network), for example.

Figure 2:
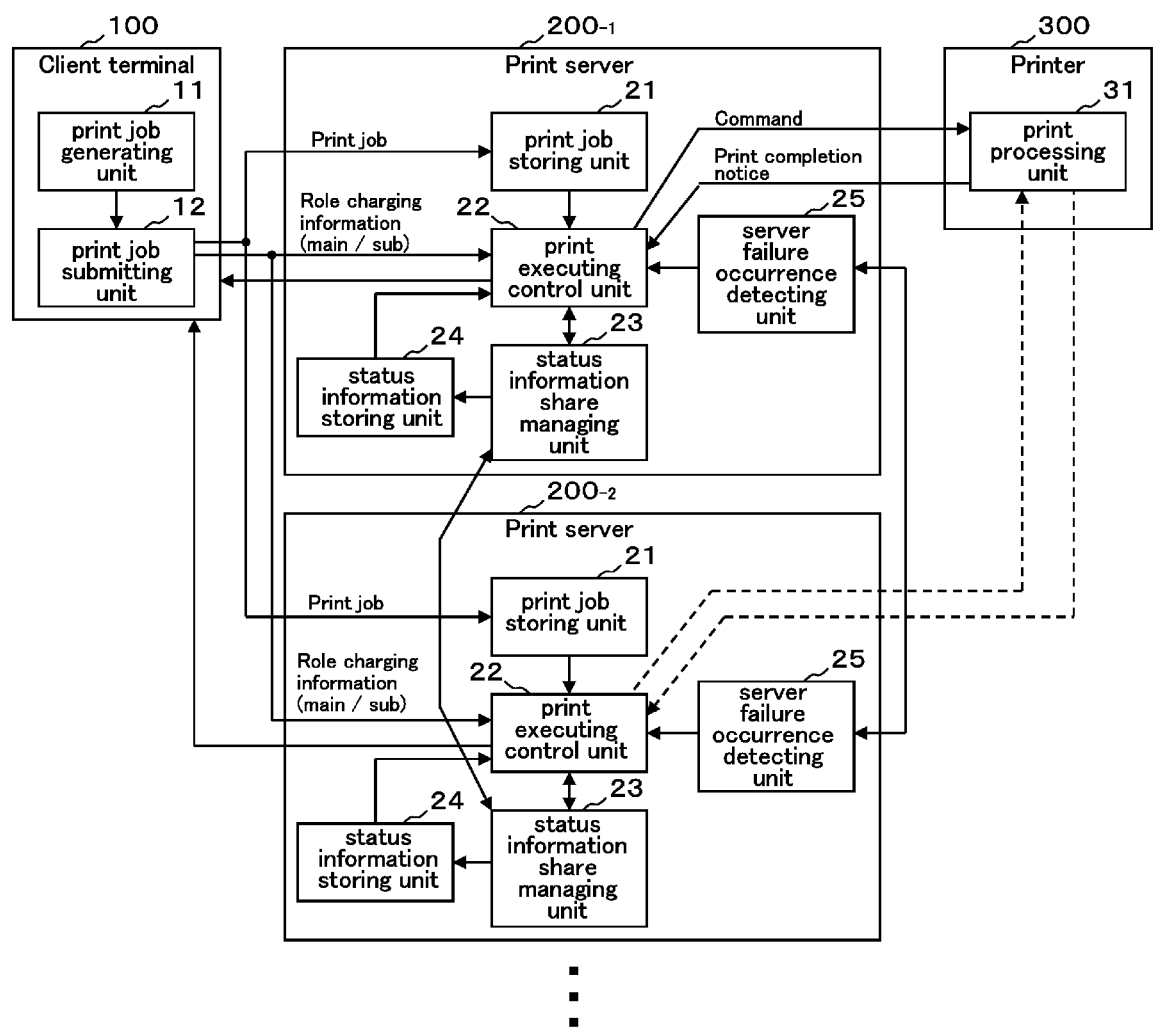
FIG. 2 is a diagram showing an example of a functional structure of the printing system according to the first embodiment.

FIG. 2 is a block diagram showing an example of a functional structure of the printing system according to the first embodiment. As shown in FIG. 2, the client terminal 100 includes a print job generating unit 11 and a print job submitting unit 12 as a functional structure thereof. Moreover, the print server 200 includes, as a functional structure thereof, a print job storing unit 21, a print executing control unit 22, a status information share managing unit 23, a status information storing unit 24, and a server failure occurrence detecting unit 25. Furthermore, the printer 300 includes a print processing unit 31 as a functional structure thereof.

Each function possessed by the client terminal 100 can also be configured from any of hardware, a DSP (Digital Signal Processor) and software. For example, if each function is configured from the software, it actually includes a CPU, an RAM and an ROM in a computer and the like and is implemented by an operation of a program stored in a recording medium such as the RAM, the ROM, a hard disk or a semiconductor memory.

Respective functions possessed by the print server 200 and the printer 300 are also the same. In other words, these functions can also be configured from any of the hardware, the DSP and the software. For example, if each of the functions is configured from the software, it actually includes a CPU, an RAM and an ROM in a computer and the like and is implemented by an operation of a program stored in a recording medium such as the RAM, the ROM, a hard disk or a semiconductor memory.

The print job generating unit 11 generates a print job in accordance with a print instruction given from a user using the client terminal 100. For example, when an instruction for printing a document covering a plurality of pages is given from the user, the print job generating unit 11 generates print jobs for the pages.

The print job submitting unit 12 submits the print job generated by the print job generating unit 11 into at least two of the n print servers 200. Herein, as an example, description will be given on the assumption that the print job is submitted into two print servers $200_{-1}$ and $200_{-2}$. At this time, the print job submitting unit 12 submits a print job by causing one of the two print servers $200_{-1}$ and $200_{-2}$ to take main charge and the other to take sub charge.

It is possible to determine, based on an optional rule, which two of the n print servers 200 are to be selected and which one of the two print servers 200 is caused to take the main charge. For example, the print servers $200_{-1}$ and $200_{-2}$ taking the main charge and the sub charge are determined in ascending order from the smallest processing load applied to the print server 200 when submitting the print job.

In this case, the print job submitting unit 12 first transmits a request to all of the print servers 200 and receives an index value representing a load situation from all of the print servers 200. The index value representing the load situation includes a usage rate of a CPU, a usage rate of a memory, an I/O level and the like. The print job submitting unit 12 determines the print servers $200_{-1}$ and $200_{-2}$ taking the main charge and the sub charge in ascending order from the smallest processing load based on the index value of the load situation received from each of the print servers 200.

The print job submitting unit 12 transmits the print job to the print servers $200_{-1}$ and $200_{-2}$ taking the main charge and the sub charge determined as described above. Moreover, the print job submitting unit 12 also transmits, to the print servers $200_{-1}$ and $200_{-2}$, assignment charge information indicating which takes the main charge or the sub charge.

The print job storing unit 21 of the print server 200 temporarily stores a print job transmitted by the print job submitting unit 12 of the client terminal 100 until the print is ended in the printer 300. In the present embodiment, the print job is transmitted from the client terminal 100 to the two print servers $200_{-1}$ and $200_{-2}$. Therefore, the same print job is stored in the print job storing units 21 of the two print servers $200_{-1}$ and $200_{-2}$.

The print executing control unit 22 controls execution of print in the printer 300 based on the print job stored in the print job storing unit 21. Specifically, the print executing control unit 22 sequentially gives the printer 300 instructions for executing print for respective pages in accordance with respective commands from a first page and receives print completion notices from the printer 300 for respective pages. The print processing unit 31 of the printer 300 executes print for respective pages in accordance with the commands sent from the print server 200 and returns the print completion notices to the print server 200 for respective ends of the print for respective pages. The print executing control unit 22 transmits one command to the printer 300 and then waits for the return of the print completion notice from the printer 300, and transmits, to the printer 300, a command for printing a next page.

Herein, only the print server $200_{-1}$ taking the main charge into which the print job submitting unit 12 submits the print job actually controls the execution of the print of the printer 300 by the print executing control unit 22 in principle. The print server $200_{-2}$ set to take the sub charge does not control the execution of the print for the printer 300 even if the print job is stored in the print job storing unit 21. The print server $200_{-2}$ taking the sub charge controls the execution of the print when a failure occurs in the print server $200_{-1}$ taking the main charge during the execution of the print (until commands corresponding to all pages are completely transmitted from the print server $200_{-1}$ taking the main charge to the printer 300).

The status information share managing unit 23 generates status information indicating which pages have been completely printed based on the print completion notice received from the printer 300 by the print executing control unit 22. Then, the status information are stored in the status information storing units 24 of the two print servers $200_{-1}$ and $200_{-2}$ into which the same print job is submitted, and are thus shared, respectively.

In the print server $200_{-1}$ taking the main charge which actually controls the execution of the print, specifically, the status information share managing unit 23 generates status information indicating which pages have been completely printed based on the print completion notice received from the printer 300 every page and stores the status information in the status information storing unit 24 of the print server $200_{-1}$ itself. Moreover, the status information share managing unit 23 transmits the generated status information to the print server $200_{-2}$ taking the sub charge. In the print server $200_{-2}$ taking the sub charge, the status information share managing unit 23 stores the status information received from the print server $200_{-1}$ taking the main charge in the status information storing unit 24 of the print server $200_{-2}$.

In the print server $200_{-1}$ taking the main charge, the print executing control unit 22 notifies the client terminal 100 of the status information about print stored in the status information storing unit 24, thereby giving the user a notice indicative of a range in which the print is completed. After the print server $200_{-2}$ taking the sub charge takes over the print job from the print server $200_{-1}$ taking the main charge as will be described below, the print executing control unit 22 notifies the client terminal 100 of the print status information in the print server $200_{-2}$ taking the sub charge.

The server failure occurrence detecting unit 25 detects occurrence of a failure in the print server 200. In the present embodiment, particularly, occurrence of a failure in the print server $200_{-1}$ taking the main charge is detected. Herein, the failure indicates such a failure that the print server $200_{-1}$ cannot continue the control of the print execution for the printer 300. Typically, a situation in which the print server $200_{-1}$ goes down or freezes and cannot be operated, a situation in which the print server $200_{-1}$ is disconnected from a communication network and cannot perform communication or the like is relevant to the foregoing.

For example, the server failure occurrence detecting units 25 of the respective print servers 200 always communicate with each other. When the communication cannot be performed with a particular partner, it is decided that a failure occurs in the print server 200 to be the partner. In other words, if the failure occurs in the print server $200_{-1}$ taking the main charge when the print server $200_{-1}$ taking the main charge and the print server $200_{-2}$ taking the sub charge always perform a communication, the print server $200_{-2}$ taking the sub charge cannot communicate with the print server $200_{-1}$ taking the main charge. In this case, the server failure occurrence detecting unit 25 of the print server $200_{-2}$ taking the sub charge decides that the failure occurs in the print server $200_{-1}$ taking the main charge.

If the occurrence of the failure in the print server $200_{-1}$ taking the main charge is detected by the server failure occurrence detecting unit 25 of the print server $200_{-2}$ taking the sub charge, the print executing control unit 22 of the print server $200_{-2}$ taking the sub charge sequentially gives the printer 300 instructions for executing print from a next unprinted page to a page indicated to be completely through the status information stored in the status information storing unit 24 based on the print job stored in the print job storing unit 21.

Figure 3:
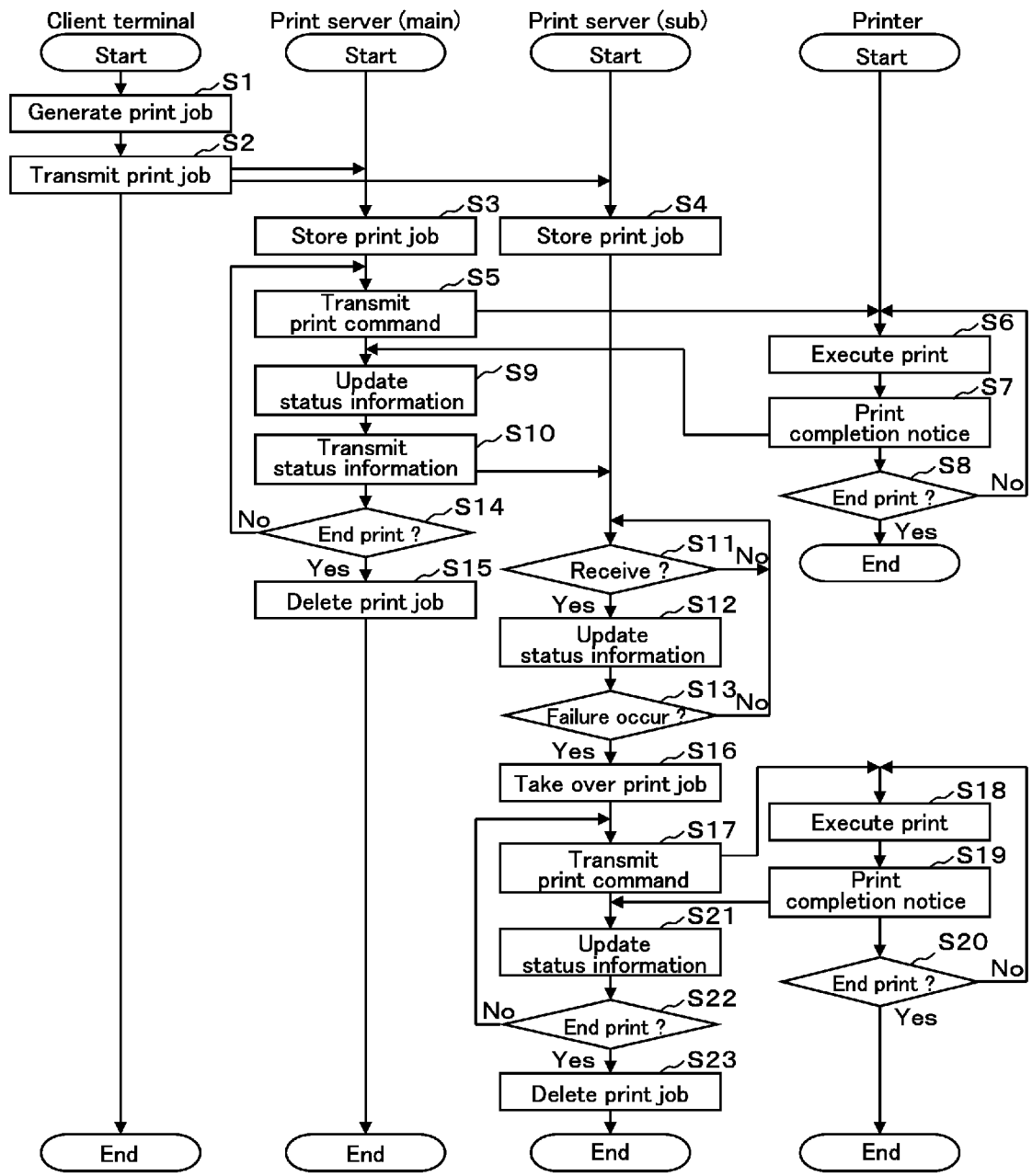
FIG. 3 is a flowchart showing an example of an operation of the printing system according to the first embodiment.

FIG. 3 is a flowchart showing an example of an operation of the printing system according to the first embodiment having the structure described above. The flowchart shown in FIG. 3 is started when an instruction for executing the print is given in the client terminal 100. First of all, the print job generating unit 11 of the client terminal 100 generates a print job in accordance with a printing instruction from a user (Step S1).

Then, the print job submitting unit 12 specifies the two print servers $200_{-1}$ and $200_{-2}$ as the main charge and the sub charge from the n print servers 200 and submits the print job generated by the print job generating unit 11 into the two print servers $200_{-1}$ and $200_{-2}$ thus specified (Step S2). At this time, the print job submitting unit 12 transmits, to the print servers $200_{-1}$ and $200_{-2}$, assignment charging information indicating which one takes the main charge or the sub charge.

In each of the two print servers $200_{-1}$ and $200_{-2}$, the print job storing unit 21 stores the print job submitted by the print job submitting unit 12 of the client terminal 100 (Steps S3 and S4). Next, the print executing control unit 22 of the print server $200_{-1}$ taking the main charge transmits, to the printer 300, a command for executing print for a first page based on the print job stored in the print job storing unit 21 (Step S5).

The print processing unit 31 of the printer 300 executes the print for the first page in accordance with a command sent from the print server $200_{-1}$ taking the main charge (Step S6) and returns a pint completion notice to the print server $200_{-1}$ taking the main charge when the print is ended (Step S7).

Herein, the print processing unit 31 decides whether the print for the all pages through the print job sent from the print server $200_{-1}$ taking the main charge in the Step S3 is ended or not (Step S8). If the print for the all pages has not been ended yet, the processing returns to the Step S6 in which the print is performed continuously. On the other hand, when the print for the all pages is ended, the processing of the flowchart shown in FIG. 3 is ended.

In the print server $200_{-1}$ taking the main charge, upon receipt of the print completion notice for the first page from the printer 300, the status information share managing unit 23 generates status information indicating which pages have been completed printed and stores the status information in the status information storing unit 24 of the print server $200_{-1}$ itself (Step S9). Moreover, the status information share managing unit 23 transmits the generated status information to the print server $200_{-2}$ taking the sub charge (Step S10).

In the print server $200_{-2}$ taking the sub charge, the status information share managing unit 23 decides whether the status information is received from the print server $200_{-1}$ taking the main charge (Step S11). If the status information is received, the status information share managing unit 23 stores it in the status information storing unit 24 of the print server $200_{-2}$ itself (Step S12). Then, the server failure occurrence detecting unit 25 of the print server $200_{-2}$ taking the sub charge decides whether a failure occurs in the print server $200_{-1}$ taking the main charge or not (Step S13). If the failure does not occur, the processing returns to the Step S11.

On the other hand, in the print server $200_{-1}$ taking the main charge, after the status information share managing unit 23 transmits the status information to the print server $200_{-2}$ taking the sub charge in the Step S10, the print executing control unit 22 decides whether the print for the all pages through the print job stored in the print job storing unit 21 in the Step S3 is ended or not (Step S14). If the print for the all pages has not been ended yet, the processing returns to the Step S5 in which execution of print for second and succeeding pages is performed continuously.

As described above, the processing of the Steps S5 to S14 is repeated. Consequently, print for one page per command is sequentially executed from the first page of the print job, and the status information is shared by the two print servers $200_{-1}$ and $200_{-2}$ every time the print for one page is ended.

If it is decided that the print for the all pages is ended in the Step S14, then, the print executing control unit 22 deletes the print job from the print job storing unit 21 (Step S15) and the processing of the flowchart shown in FIG. 3 is ended. If it is decided that the print for the all pages is ended based on the status information stored in the status information storing unit 24 also in the print server $200_{-2}$ taking the sub charge, the print executing control unit 22 deletes the print job from the print job storing unit 21, which is not shown in FIG. 3.

On the other hand, if the server failure occurrence detecting unit 25 decides that a failure occurs in the print server $200_{-1}$ taking the main charge in the Step S13, the print executing control unit 22 confirms the status information stored in the status information storing unit 24 and takes over the execution of the print job in the print server $200_{-2}$ taking the sub charge (Step S16).

The print executing control unit 22 of the print server $200_{-2}$ taking the sub charge which has taken over the print job confirms the status information stored in the status information storing unit 24 and transmits, to the printer 300, a command for executing print from an unprinted page (Step S17). The print processing unit 31 of the printer 30 executes the print for one page in accordance with the command sent from the print server $200_{-2}$ taking the sub charge (Step S18) and returns the print completion notice to the print server $200_{-2}$ taking the sub charge when the print is ended (Step S19).

Herein, the print processing unit 31 decides whether the print for the all pages through the print job sent from the print servers $200_{-1}$ taking the main charge in the Step S4 is ended or not (Step S20). If the print for the all pages has not been ended yet, the processing returns to the Step S18 and the print is performed continuously. On the other hand, if the print for the all pages is ended, the processing of the flowchart shown in FIG. 3 is ended.

In the print server $200_{-2}$ taking the sub charge, upon receipt of the print completion notice from the printer 300, the status information share managing unit 23 generates status information indicating which pages have been completely printed and stores the status information in the status information storing unit 24 of the print server $200_{-2}$ itself (Step S21).

Thereafter, the print executing control unit 22 decides whether the print for the all pages through the print job taken over in the Step S16 is ended or not (Step S22). If the print for the all pages has not been ended yet, the processing returns to the Step S17 in which the execution of the print for succeeding pages is performed continuously. On the other hand, if it is decided that the print for the all pages is ended, the print executing control unit 22 deletes the print job from the print job storing unit 21 (Step S23) and the processing of the flowchart shown in FIG. 3 is ended.

As described above in detail, in the first embodiment, after the print job generated in the client terminal 100 is submitted into the two print servers $200_{-1}$ and $200_{-2}$, instructions for executing the print from the first page are sequentially given to the printer 300 and the print completion notices are received from the printer 300 for respective pages in the single print server $200_{-1}$ taking the main charge. Then, the status information indicating which pages have been completely printed is shared by the two print servers $200_{-1}$ and $200_{-2}$.

If there is detected the occurrence of the failure in the print server $200_{-1}$ which is executing the print, thereafter, the print job is taken over in the print server $200_{-2}$ taking the sub charge. At this time, the print executing control unit 22 sequentially gives the printer 300 instructions for executing print from the unprinted page based on the status information shared in the status information storing unit 24 in accordance with the print job which has already been stored in the print job storing unit 21.

According to the first embodiment having such a structure, if a failure occurs in the print server $200_{-1}$ taking the main charge which is executing the print job, the execution of the print job is taken over in the print server $200_{-2}$ taking the sub charge into which the same print job as the print job which is being executed in the print server $200_{-1}$ has already been submitted. In addition, the status information of the print executed before the occurrence of the failure is stored in the status information storing unit 24 of the print server $200_{-2}$ taking the sub charge. By referring to the status information, therefore, it is possible to immediately issue a command for print based on the submitted print job from a continuation part of the page in the occurrence of the failure. When taking over the print job depending on the occurrence of the failure, consequently, it is possible to continuously execute the print without stoppage and to avoid double printing without newly generating a print job for an unprinted page.

(Second Embodiment)

Figure 4:
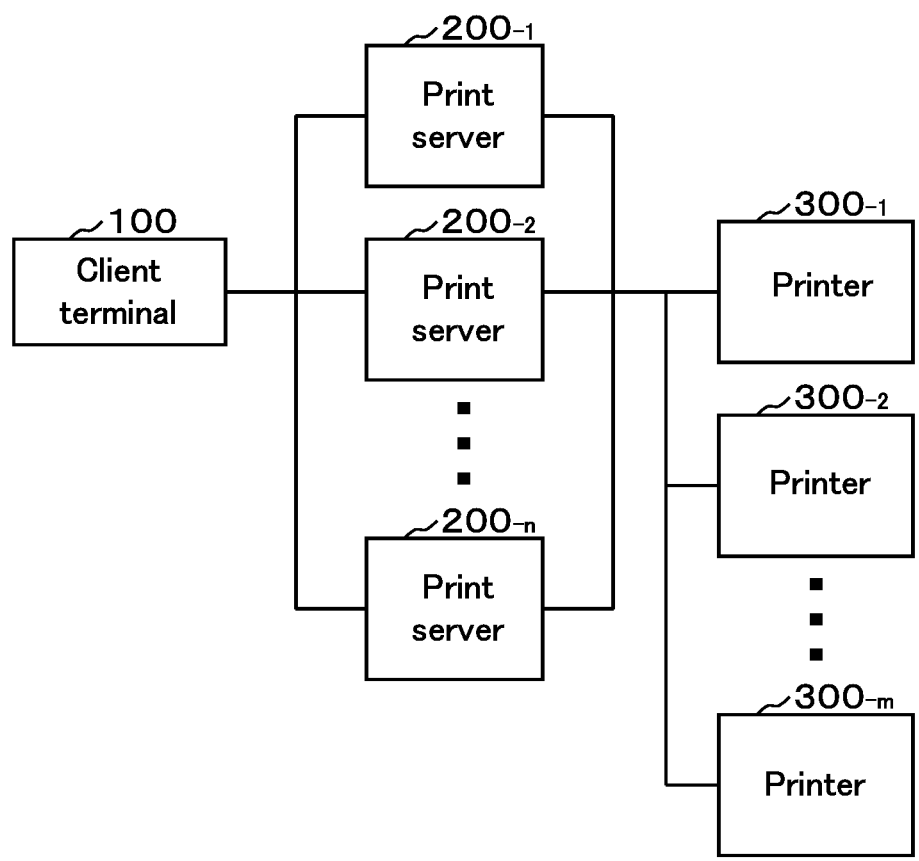
FIG. 4 is a diagram showing an example of a structure of a printing system according to a second embodiment.

Next, a second embodiment of the present invention will be described with reference to the drawings. FIG. 4 is a diagram showing an example of a structure of a printing system according to the second embodiment. As shown in FIG. 4, the printing system according to the second embodiment is a printing system in a cluster environment having a plurality of print servers and a plurality of printers and is configured from a client terminal 100, n print servers 200, and m printers $3000_{-1}, 300_{-2}, \ldots, 300_{-m}$ (hereinafter referred to as a printer 300).

Figure 5:
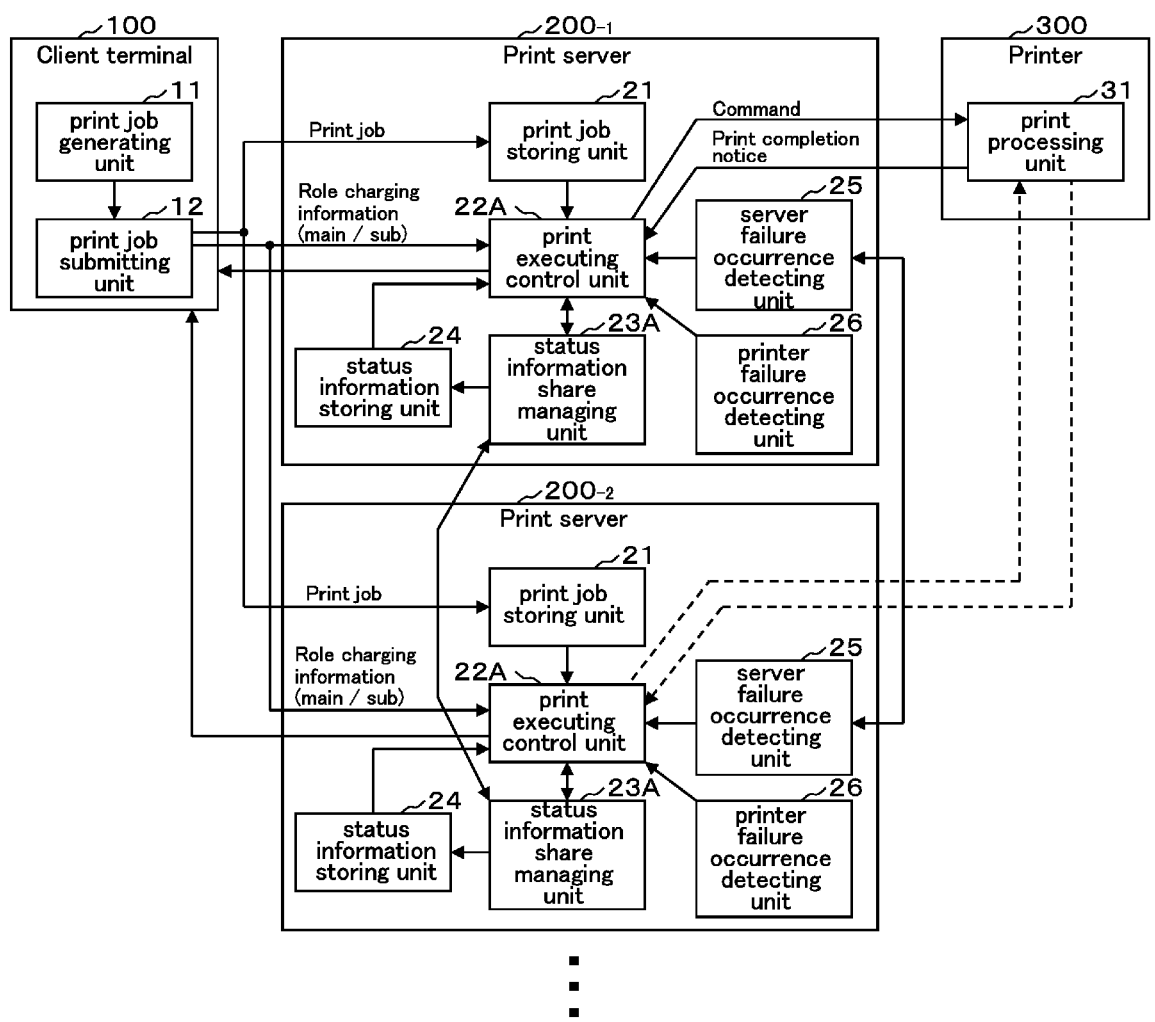
FIG. 5 is a diagram showing an example of a functional structure of the printing system according to the second embodiment.

FIG. 5 is a block diagram showing an example of a functional structure of the printing system according to the second embodiment. In FIG. 5, components having the same reference numerals as those shown in FIG. 2 have the same functions and repetitive description will be therefore omitted. As shown in FIG. 5, the print server 200 further includes a printer failure occurrence detecting unit 26 as a functional structure thereof. Moreover, a print executing control unit 22A and a status information share managing unit 23A are provided in place of the print executing control unit 22 and the status information share managing unit 23.

The print executing control unit 22A specifies one of the m printers 300 and sequentially gives instructions for executing print from a first page. It is possible to determine, based on an optional rule, which one of the m printers 300 is to be selected. For example, when the instruction for executing the print is given by the client terminal 100, which one of the printers 300 is to be used is simultaneously given as an instruction. The print executing control unit 22A specifies one of the printers 300 to give instructions for executing print in accordance with the instruction.

The status information share managing unit 23A generates status information indicating which one of the m printers 300 is used and which pages have been completely printed based on the print completion notice received from the printer 300 by the print executing control unit 22A. Then, the status information is stored and shared by the status information storing units 24 of the n print servers 200, respectively.

The printer failure occurrence detecting unit 26 detects occurrence of a failure in the printer 300 which is executing the print. Herein, the failure indicates such a failure that the printer 300 cannot continue the execution of the print. For example, a situation in which the printer 300 is disconnected from a communication network so that a communication cannot be performed and a situation in which paper exhaustion, paper jamming or the like occurs are relevant to the failure. Specifically, when a transmission error is returned even if the print executing control unit 22A transmits a command to the printer 300 or when a print completion notice cannot be returned for a certain time or more, the printer failure occurrence detecting unit 26 decides that the failure occurs in the printer 300.

If the occurrence of the failure in the printer 300 which is executing the print is detected by the printer failure occurrence detecting unit 26, the print executing control unit 22A sequentially gives another printer 300 instructions for executing print from a next unprinted page to a page indicating completion of print by referring to the status information stored in the status information storing unit 24. Herein, it is preferable that another printer 300 to be selected should be a printer in a vacant state that is not executing the print.

In the second embodiment, status information indicating which one of the printers 300 is executing the print is shared by the n print servers 200. For this reason, when the print executing control unit 22A starts to give another printer 300 instructions for executing print depending on the occurrence of the failure, it is possible to immediately specify the printer 300 which has not executed the print, thereby executing the print continuously without making an inquiry for the m printers 300 to confirm a print situation at that time.

If the printer 300 which has not executed the print is not present, it is preferable to specify the printer 300 having the smallest number of residual pages till the end of the print, thereby taking over the execution of the print job. By referring to the status information shared by the n print servers 200, it is possible to immediately confirm which one of the printers 300 has the smallest number of residual pages.

(Third Embodiment)

Figure 6:
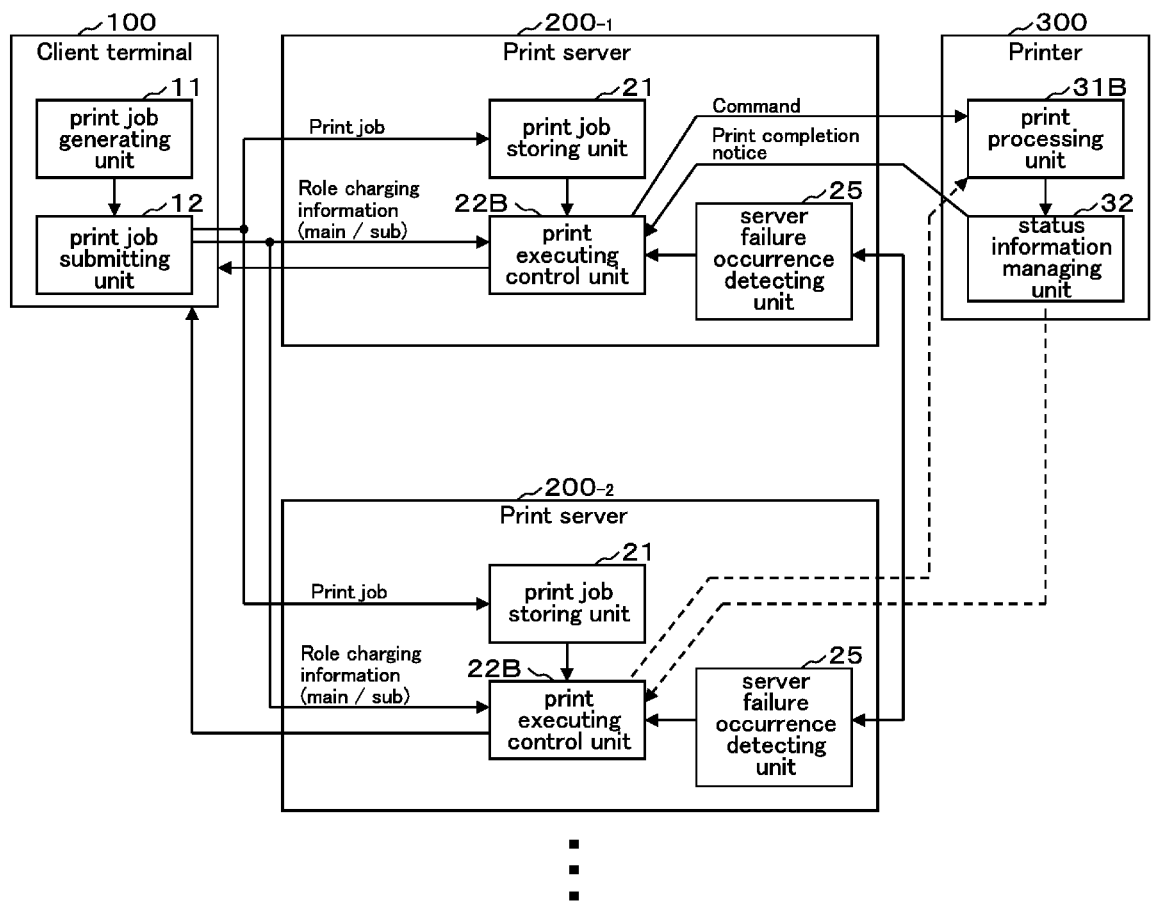
FIG. 6 is a diagram showing an example of a functional structure of a printing system according to a third embodiment.

Next, a third embodiment of the present invention will be described with reference to the drawings. A whole structure of a printing system according to the third embodiment is the same as that in FIG. 1. FIG. 6 is a block diagram showing an example of a functional structure of the printing system according to the third embodiment. In FIG. 6, components having the same reference numerals as those shown in FIG. 2 have the same functions, and repetitive description will be therefore omitted.

As shown in FIG. 6, a print server 200 includes, as a functional structure thereof, a print executing control unit 22B in place of the print executing control unit 22. On the other hand, the print server 200 includes neither the status information share managing unit 23 nor the status information storing unit 24, both of which are provided in the embodiment of FIG. 2. Moreover, a printer 300 further includes, as a functional structure thereof, a print processing unit 31B in place of the print processing unit 31, and a status information managing unit 32.

The print executing control unit 22B of the print server 200 gives the printer 300 an instruction for executing print through a print job for all pages based on a print job stored in a print job storing unit 21. In other words, the print executing control unit 22B gives an instruction for executing print by transmitting the print job stored in the print job storing unit 21 to the printer 300 without reconfiguration. In the third embodiment, an instruction for executing print for the all pages is given to the printer 300 also in a print server $200_{-1}$ taking main charge and a print server $200_{-2}$ taking sub charge which takes over the print job when a failure occurs in the print server $200_{-1}$ taking the main charge in transmission of the print job to the printer 300.

The print processing unit 31B of the printer 300 executes print for each page in accordance with the print job sent from the print server 200. The status information managing unit 32 generates status information indicating which pages have been completely printed and stores the status information in an internal memory (not shown) based on a result of the execution of the print through the print processing unit 31B. Herein, the status information managing unit 32 updates the status information and successively stores the status information in the internal memory every time print for one page is ended by the print processing unit 31B. Moreover, the status information managing unit 32 transmits, to the print server 200, the status information of the print stored in the internal memory every predetermined timing.

In the third embodiment, the print processing unit 31B executes the print from the first page when a print job for all pages is sent from the print server $200_{-1}$ taking the main charge. On the other hand, the print processing unit 31B discards (skips) pages indicated to be completely printed through the status information stored in the internal memory and executes print from a next unprinted page when the print job for all pages is sent from the print server $200_{-2}$ taking the sub charge.

Each predetermined timing for the printer 300 to transmit the status information of the print may be each timing for completing print for n pages (n is an optional value which is one or more and equal to or smaller than a maximum page number of the print job) or may be each predetermined time. Alternatively, it is also possible to receive an inquiry from the print executing control unit 22B of the print server 200 every predetermined time and to transmit the status information as a response to the inquiry. In order to avoid frequent occurrence of a communication between the print server 200 and the printer 300, description will be given to an example in which the status information is transmitted in response to an inquiry for each predetermined time.

For example, in the case in which the printer 300 is a network apparatus utilizing an SNMP (Simple Network Management Protocol), it is possible to inform an outside of the status information of the printer 300 by using a mechanism of an MIB (Management Information Base). The print executing control unit 22B makes an inquiry for the printer 300 by utilizing the mechanism of the MIB, thereby acquiring the status information from the printer 300.

In the print server $200_{-1}$ taking the main charge, the print executing control unit 22B notifies the client terminal 100 of the status information about the print received from the printer 300, thereby informing a user of a range which has been completely printed. After the print server $200_{-2}$ taking the sub charge takes over the print job from the print server $200_{-1}$ taking the main charge, the print executing control unit 22B notifies the client terminal 100 of the status information of the print in the print server $200_{-2}$ taking the sub charge.

Figure 7:
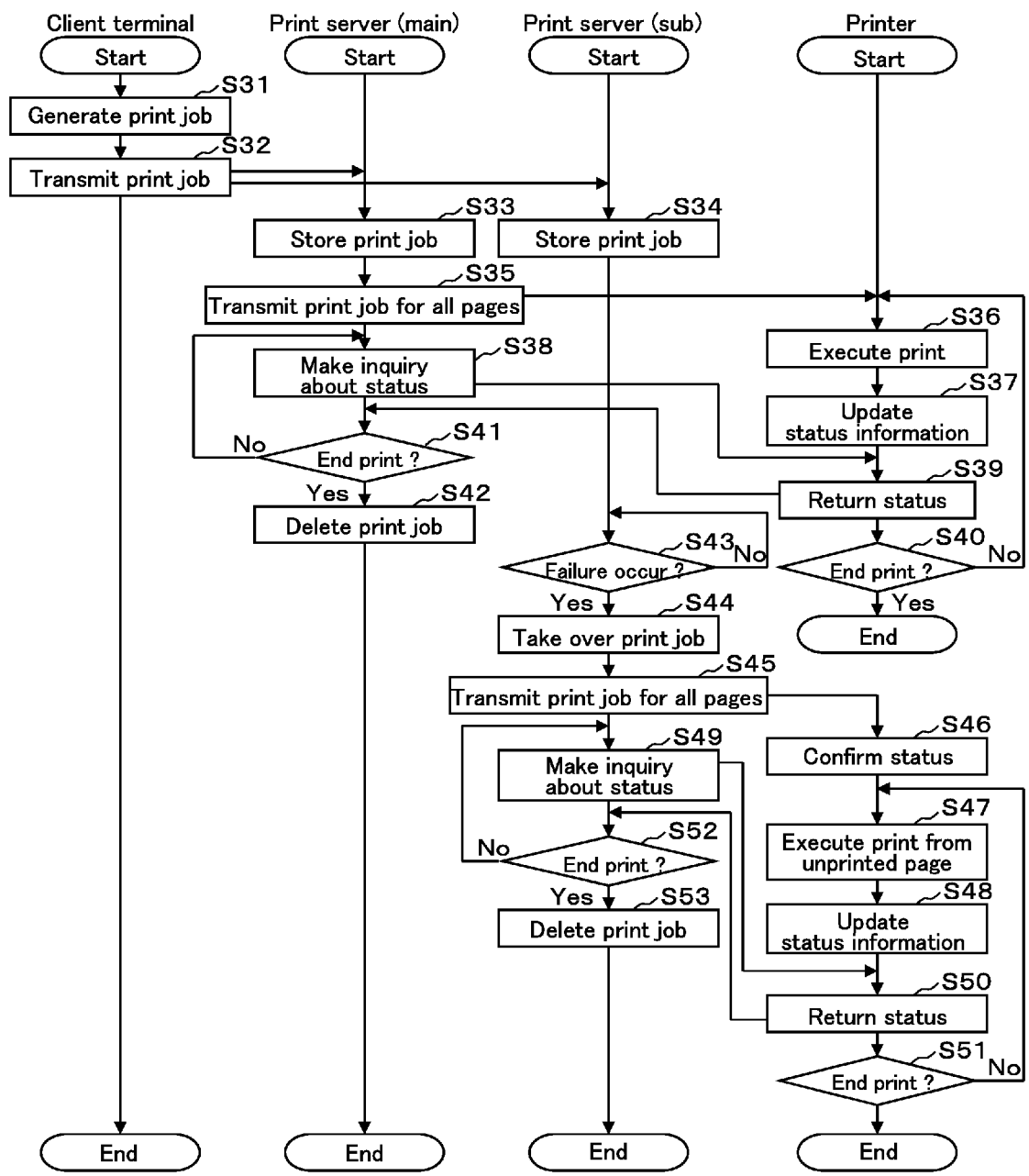
FIG. 7 is a flowchart showing an example of an operation of the printing system according to the third embodiment.

FIG. 7 is a flowchart showing an example of an operation of the printing system according to the third embodiment having the structure described above. The flowchart shown in FIG. 7 is started when an instruction for executing print is given in the client terminal 100. First of all, the print job generating unit 11 of the client terminal 100 generates a print job in accordance with a print instruction given from the user (Step S31).

Then, the print job submitting unit 12 specifies the two print servers $200_{-1}$ and $200_{-2}$ as the main charge and the sub charge from the n print servers 200 and submits the print job generated by the print job generating unit 11 into the two print servers $200_{-1}$ and $200_{-2}$ thus specified (Step S32). At this time, the print job submitting unit 12 transmits, to the print servers $200_{-1}$ and $200_{-2}$, assignment charging information indicating which one takes the main charge or the sub charge.

In each of the two print servers $200_{-1}$ and $200_{-2}$, the print job storing unit 21 stores the print job submitted by the print job submitting unit 12 of the client terminal 100 (Steps S33 and S34). Next, the print executing control unit 22B of the print server $200_{-1}$ taking the main charge transmits, to the printer 300, a print job for all pages stored in the print job storing unit 21, thereby giving an instruction for executing the print (Step S35).

The print processing unit 31B of the printer 300 executes the print from a first page while receiving the print job sent from the print server $200_{-1}$ taking the main charge (Step S36). Moreover, the status information managing unit 32 generates status information indicating which pages have been completely printed and stores the status information in the internal memory (Step S37).

In the print server $200_{-1}$ taking the main charge, after the transmission of the print job is started in the Step S35, an inquiry about the status information is made for the printer 300 in such a timing that a predetermined time passes (Step S38). The status information managing unit 32 of the printer 300 returns the status information stored in the internal memory to the printer server $200_{-1}$ taking the main change in response to the inquiry (Step S39).

Herein, the print processing unit 31B decides whether the print for the all pages through the print job sent from the print server $200_{-1}$ taking the main charge is ended or not (Step S40). If the print for the all pages has not been ended yet, the processing returns to the Step S36 and the print is performed continuously. On the other hand, if the print for the all pages is ended, the processing of the flowchart shown in FIG. 7 is ended.

In the print server $200_{-1}$ taking the main charge, after the print executing control unit 23B makes an inquiry for the printer 300 in the Step S38, the print executing control unit 23B decides whether the print for the all pages through the print job transmitted to the printer 300 in the Step S35 is ended or not based on the status information returned from the printer 300 (Step S41). If the print for the all pages has not been ended yet, the processing returns to the Step S38 in which the inquiry about the status information is made again in such a timing that a predetermined time further passes.

On the other hand, if it is decided that the print for the all pages is ended, the print executing control unit 22B deletes the print job from the print job storing unit 21 (Step S42) and the processing of the flowchart shown in FIG. 7 is ended. The print server $200_{-2}$ taking the sub charge is notified of the end of the print from the print server $200_{-1}$ taking the main charge and the print executing control unit 22B deletes the print job from the print job storing unit 21 also in the print server $200_{-2}$ taking the sub charge in response thereto, which is not shown in FIG. 7.

Thus, the processing of the Steps S35 to S42 is performed between the print server $200_{-1}$ taking the main charge and the printer 300. At the same time, in the print server $200_{-2}$ taking the sub charge, the server failure occurrence detecting unit 25 decides whether a failure occurs in the print server $200_{-1}$ taking the main charge or not (Step S43). Herein if it is decided whether the failure occurs in the print server $200_{-1}$ taking the main charge, the print executing control unit 22B takes over the execution of the print job in the print server $200_{-2}$ taking the sub charge (Step S44).

The print executing control unit 22B of the print server $200_{-2}$ taking the sub charge which takes over the print job transmits, to the printer 300, the print job for all pages stored in the print job storing unit 21, thereby giving an instruction for executing print (Step S45). The print processing unit 31B of the printer 300 confirms pages indicated to be completely printed through the status information stored in the internal memory if the print job for all pages is sent from the print server $200_{-2}$ taking the sub charge (Step S46). Then, the print processing unit 31B skips the pages printed completely and executes the print from a next unprinted page (Step S47).

Moreover, the status information managing unit 32 generates status information indicating which pages have been printed completely and stores the status information in the internal memory (Step S48). In the print server $200_{-2}$ taking the sub charge which takes over the print job, after the transmission of the print job is started in the Step S45, an inquiry about the status information is made for the printer 300 in such a timing that a predetermined time passes (Step S49). The status information managing unit 32 of the printer 300 returns the status information stored in the internal memory to a print server $200_{-2}$ taking the sub charge in response to the inquiry (Step S50).

Herein, the print processing unit 31B decides whether the print for the all pages through the print job sent again from the print server $200_{-2}$ taking the sub charge in the Step S45 is ended or not (Step S51). If the print for the all pages has not been ended yet, the processing returns to the Step S47 in which the print is continuously performed. On the other hand, if the print for the all pages is ended, the processing of the flowchart shown in FIG. 7 is ended.

In the print server $200_{-2}$ taking the sub charge, after the print executing control unit 22B makes an inquiry for the printer 300 in the Step S49, the print executing control unit 22B decides whether the print for the all pages through the print job transmitted to the printer 300 in the Step S45 is ended or not based on the status information retuned from the printer 300 (Step S52). If the print for the all pages has not been ended yet, the processing returns to the Step S49 and the inquiry about the status information is made again in such a timing that a predetermined time further passes. On the other hand, if it is decided that the print for the all pages is ended, the print executing control unit 22B deletes the print job from the print job storing unit 21 (Step S53) and the processing of the flowchart shown in FIG. 7 is ended.

As described above in detail, in the third embodiment, the print job generated in the client terminal 100 is submitted into the two print servers $200_{-1}$ and $200_{-2}$ and the print job for all pages submitted from the client terminal 100 are transmitted to the printer 300 to give an instruction for executing print in the single print server $200_{-1}$ taking the main charge. Upon receipt of the instruction, then, the printer 300 executes the print to successively update the status information of the print and stores the status information thus updated in the internal memory.

If there is detected occurrence of a failure in the print server $200_{-1}$ taking the main charge which is executing the print (during transmission of the print job), thereafter, the print job is taken over in the print server $200_{-2}$ taking the sub charge. At this time, also in the print server $200_{-2}$ taking the sub charge, the print job for all pages submitted from the client terminal 100 is transmitted as it is to the printer 300 to give an instruction for executing the print. In the printer 300 receiving the instruction, then, reference is made to the status information stored in the internal memory to execute the print from an unprinted page.

According to the third embodiment having such a structure, when a failure occurs in the print server $200_{-1}$ taking the main charge which is transmitting a print job, the print server $200_{-2}$ taking the sub charge which takes over the print job sufficiently transmits the print job, as it is, which has already been submitted from the client terminal 100 to the printer 300, thereby giving an instruction for executing the print. At the printer 300 side, thereafter, it is possible to skip the printed pages, thereby executing the print from the unprinted page. When the print server $200_{-2}$ taking the sub charge takes over the print job depending on the occurrence of the failure, consequently, it is possible to continuously execute the print by shortening a temporary stoppage time and to avoid double printing without newly generating the print job for the unprinted page.

(Fourth Embodiment)

Figure 8:
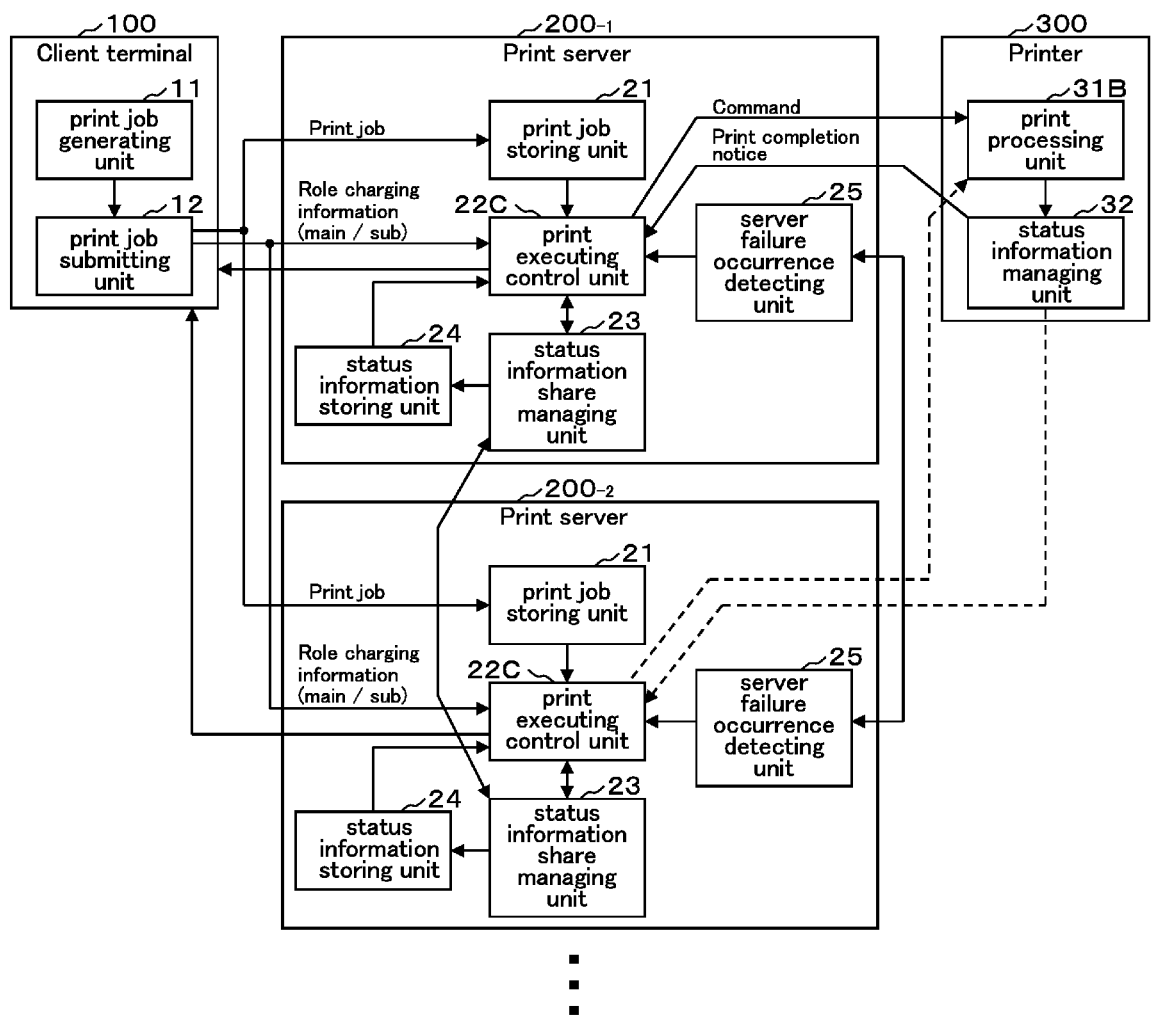
FIG. 8 is a diagram showing an example of a functional structure of a printing system according to a fourth embodiment.

Next, a fourth embodiment of the present invention will be described with reference to the drawings. A whole structure of a printing system according to the fourth embodiment is the same as that in FIG. 1. FIG. 8 is a block diagram showing an example of a functional structure of the printing system according to the fourth embodiment. In FIG. 8, components having the same reference numerals as those shown in FIGS. 2 and 6 have the same functions, and repetitive description will be therefore omitted.

As shown in FIG. 8, a print server 200 includes, as a functional structure thereof, a print executing control unit 22C in place of the print executing control unit 22 shown in FIG. 2. Moreover, a printer 300 includes, as a functional structure thereof, a print processing unit 31B in place of the print processing unit 31 shown in FIG. 2, and further includes a status information managing unit 32. The print processing unit 31B and the status information managing unit 32 have the same functions as those shown in FIG. 6.

The print executing control unit 22C of the print server 200 gives the printer 300 an instruction for executing print based on a print job stored in a print job storing unit 21, and acquires status information of print from the printer 300 every predetermined timing. Each predetermined timing is the same as that described in the third embodiment. Description will be given to an example in which the printer 300 transmits the status information in response to an inquiry sent from the print server 200 every predetermined time.

In the fourth embodiment, the content of the print job to be transmitted to the printer 300 differs depending on whether the print server 200 takes the main charge or the sub charge which takes over the print job. In other words, in the case of the print server $200_{-1}$ taking the main charge, the print executing control unit 22C gives the printer 300 an instruction for executing print through a print job for all pages in the same manner as in the third embodiment. In other words, the print executing control unit 22C transmits, to the printer 300, the print job stored in the print job storing unit 21 without reconfiguration.

On the other hand, in the case of the print server $200_{-2}$ taking the sub charge which takes over the print job when a failure occurs in the print server $200_{-1}$ taking the main charge which is transmitting the print job, the print executing control unit 22C generates a print job from a next page to a page indicated to be completely printed through the status information stored in the status information storing unit 24 (which will be hereinafter referred to as a print job for completion non-notification pages) based on the print job stored in the print job storing unit 21, and gives the printer 300 an instruction for executing print based thereon. In other words, the print executing control unit 22C reconfigures the print job for completion non-notification pages based on the print job stored in the print job storing unit 21 and transmits the print job to the printer 300.

The status information share managing unit 23 generates the status information indicating which pages have been completely printed based on the status information of the print acquired from the printer 300 every predetermined time by the print executing control unit 22C. Then, the status information is stored in the status information storing units 24 of the two print servers $200_{-1}$ and $200_{-2}$ into which the same print job is submitted, and is shared, respectively. The status information in the internal memory is updated every page by the status information managing unit 32 in the printer 300, while the status information of the status information storing unit 24 is updated every predetermined time by the status information share managing units 23 in the print servers $200_{-1}$ and $200_{-2}$. For this reason, there is generated a time zone making a difference between both of the status information.

The print processing unit 31B of the printer 300 executes print every page in accordance with the print job sent from the print server 200. Specifically, the print processing unit 31B executes the print from a first page when the print job for all pages is sent from the print server $200_{-1}$ taking the main charge. On the other hand, when the print job for completion non-notification pages is sent from the print server $200_{-2}$ taking the sub charge, the print processing unit 31B discards (skips) any of the completion non-notification pages which is indicated to be completely printed through the status information stored in the internal memory and executes the print from a next unprinted page.

Figure 9:
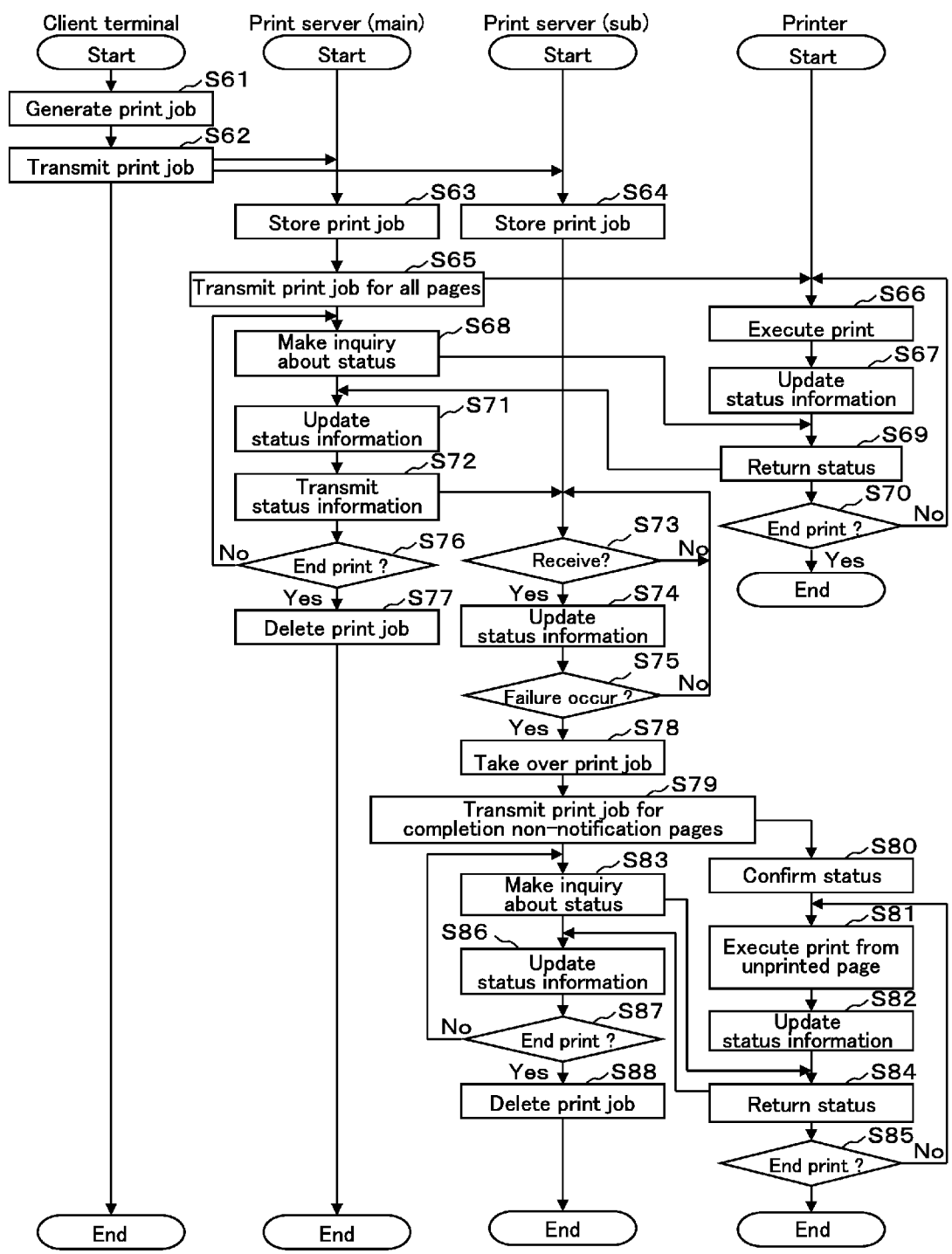
FIG. 9 is a flowchart showing an example of an operation of the printing system according to the fourth embodiment.

FIG. 9 is a flowchart showing an example of an operation of the printing system according to the fourth embodiment having the structure described above. The flowchart shown in FIG. 9 is started when an instruction for executing the print is given in the client terminal 100. First of all, the print job generating unit 11 of the client terminal 100 generates a print job in accordance with a printing instruction sent from a user (Step S61).

Then, the print job submitting unit 12 specifies the two print servers $200_{-1}$ and $200_{-2}$ as the main charge and the sub charge from the n print servers 200 and submits the print job generated by the print job generating unit 11 into the two print servers $200_{-1}$ and $200_{-2}$ thus specified (Step S62). At this time, the print job submitting unit 12 transmits, to the print servers $200_{-1}$ and $200_{-2}$, assignment charging information indicating which one takes the main charge or the sub charge.

In each of the two print servers $200_{-1}$ and $200_{-2}$, the print job storing unit 21 stores the print job submitted by the print job submitting unit 12 of the client terminal 100 (Steps S63 and S64). Next, the print executing control unit 22C of the print server $200_{-1}$ taking the main charge transmits, to the printer 300, a print job for all pages stored in the print job storing unit 21, thereby giving an instruction for executing the print (Step S65).

The print processing unit 31B of the printer 300 executes the print from a first page while receiving the print job sent from the print server $200_{-1}$ taking the main charge (Step S66). Moreover, the status information managing unit 32 generates status information indicating which pages have been completely printed and stores the status information in the internal memory (Step S67).

In the print server $200_{-1}$ taking the main charge, after the transmission of the print job is started in the Step S65, an inquiry about the status information is made for the printer 300 in such a timing that a predetermined time passes (Step S68). The status information managing unit 32 of the printer 300 returns the status information stored in the internal memory to the print server $200_{-1}$ taking the main charge in response to the inquiry (Step S69).

Herein, the print processing unit 31B decides whether the print for the all pages through the print job sent from the print server $200_{-1}$ taking the main charge is ended or not (Step S70). If the print for the all pages has not been ended yet, the processing returns to the Step S66 and the print is performed continuously. On the other hand, if the print for the all pages is ended, the processing of the flowchart shown in FIG. 9 is ended.

In the print server $200_{-1}$ taking the main charge, after the print executing control unit 22C makes an inquiry for the printer 300 in the Step S68, a notice of the status information is received from the printer 300, the status information share managing unit 23 generates status information indicating which pages have been completed printed and stores the status information in the status information storing unit 24 of the print server $200_{-1}$ itself (Step S71). Moreover, the status information share managing unit 23 transmits the generated status information to the print server $200_{-2}$ taking the sub charge (Step S72).

In the print server $200_{-2}$ taking the sub charge, the status information share managing unit 23 decides whether the status information is received from the print server $200_{-1}$ taking the main charge or not (Step S73). If the status information is received, it is stored in the status information storing unit 24 of the print server $200_{-2}$ itself (Step S74). Then, the server failure occurrence detecting unit 25 of the print server $200_{-2}$ taking the sub charge decides whether a failure occurs in the print server $200_{-1}$ taking the main charge or not (Step S75). If the failure does not occur, the processing returns to the Step S73.

On the other hand, in the print server $200_{-1}$ taking the main charge, after the status information share managing unit 23 transmits the status information to the print server $200_{-2}$ taking the sub charge in Step S72, the print executing control unit 22C decides whether the print for the all pages through the print job transmitted to the printer 300 in the Step S65 is ended or not based on the status information stored in the status information storing unit 24 (Step S76). If the print for the all pages has not been ended yet, the processing returns to the Step S68 in which the inquiry for the status information is made again in such a timing that a predetermined time further passes.

On the other hand, if it is decided that the print for the all pages is ended, the print executing control unit 22C deletes the print job from the print job storing unit 21 (Step S77) and the processing of the flowchart shown in FIG. 9 is ended. If it is decided that the print for the all pages is ended based on the status information stored in the status information storing unit 24 also in the print server $200_{-2}$ taking the sub charge, the print executing control unit 22C deletes the print job from the print job storing unit 21, which is not shown in FIG. 9.

In contrast, if the server failure occurrence detecting unit 25 decides that a failure occurs in the print server $200_{-1}$ taking the main charge in the Step S75, the print executing control unit 22C takes over the execution of the print job in the print server $200_{-2}$ taking the sub charge (Step S78). The print executing control unit 22C of the print server $200_{-2}$ taking the sub charge which takes over the print job confirms the status information stored in the status information storing unit 24 and transmits, to the printer 300, a print job for completion non-notification pages from a next page to the page indicated to be completely printed, thereby giving an instruction for executing the print (Step S79).

The print processing unit 31B of the printer 300 confirms pages indicated to be completely printed through the status information stored in the internal memory if the print job for completion non-notification pages is sent from the print server $200_{-2}$ taking the sub charge (Step S80). Then, the print processing unit 31B skips any of the completion non-notification pages which is completely printed and executes the print from a next unprinted page (Step S81).

Moreover, the status information managing unit 32 generates status information indicating which pages have been printed completely and stores the status information in the internal memory (Step S82). In the print server $200_{-2}$ taking the sub charge which takes over the print job, after the transmission of the print job is started in the Step S79, an inquiry about the status information is made for the printer 300 in such a timing that a predetermined time passes (Step S83). The status information managing unit 32 of the printer 300 returns the status information stored in the internal memory to the print server $200_{-2}$ taking the sub charge in response to the inquiry (Step S84).

Herein, the print processing unit 31B decides whether the print for the all pages through the print job sent again from the print server $200_{-2}$ taking the sub charge in the Step S79 is ended or not (Step S85). If the print for the all pages has not been ended yet, the processing returns to the Step S81 in which the print is continuously performed. On the other hand, if the print for the all pages is ended, the processing of the flowchart shown in FIG. 9 is ended.

In the print server $200_{-2}$ taking the sub charge, after the print executing control unit 22C makes an inquiry for the printer 300 in the Step S83, when a notice of the status information is received from the printer 300, the status information share managing unit 23 generates status information indicating which pages have been completely printed and stores the status information in the status information storing unit 24 of the print server $200_{-2}$ itself (Step S86).

Then, the print executing control unit 22C decides whether the print for the all pages through the print job transmitted to the printer 300 in the Step S79 is ended or not based on the status information stored in the status information storing unit 24 (Step S87). If the print for the all pages has not been ended yet, the processing returns to the Step S83 and the inquiry about the status information is made again in such a timing that a predetermined time further passes. On the other hand, if it is decided that the print for the all pages is ended, the print executing control unit 22C deletes the print job from the print job storing unit 21 (Step S88) and the processing of the flowchart shown in FIG. 9 is ended.

As described above in detail, in the fourth embodiment, the print job generated in the client terminal 100 is submitted into the two print servers $200_{-1}$ and $200_{-2}$ and the print job for all pages submitted from the client terminal 100 is transmitted to the printer 300 to give an instruction for executing print in the single print server $200_{-1}$ taking the main charge. Upon receipt of the instruction, the printer 300 executes the print to successively update the status information of the print and to store the status information thus updated in the internal memory. Moreover, an inquiry about the status information is periodically made for the printer 300 from the print server $200_{-1}$ taking the main charge, and the status information acquired from the printer 300 is shared by the two print servers $200_{-1}$ and $200_{-2}$.

If there is detected occurrence of a failure in the print server $200_{-1}$ taking the main charge which is executing the print (during transmission of the print job), the print job is taken over in the print server $200_{-2}$ taking the sub charge. At this time, in the print server $200_{-2}$ taking the sub charge, the print executing control unit 22C reconfigures the print job for completion non-notification pages based on the status information shared by the status information storing unit 24 by using the print job which has already been stored in the print job storing unit 21, and transmits the print job to the printer 300. In the printer 300, then, reference is made to the status information stored in the internal memory to skip any of the completion non-notification pages which has actually been printed completely and to execute the print from a next unprinted page.

According to the fourth embodiment having such a structure, when a failure occurs in the print server $200_{-1}$ taking the main charge which is transmitting a print job, it is necessary to reconfigure the print job for completion non-notification pages from the print job for all pages which have already been submitted from the client terminal 100 in the print server $200_{-2}$ taking the sub charge which takes over the print job. At the printer 300 side, however, it is possible to decrease the number of the pages which have already been printed and are to be skipped from the print job sent from the print server $200_{-2}$ taking the sub charge. For this reason, it is possible to reduce a time required for confirming the pages to be skipped. When the print server $200_{-2}$ taking the sub charge takes over the print job depending on the occurrence of the failure, consequently, it is possible to continuously execute the print by shortening a temporary stoppage time and to avoid double printing.

(Fifth Embodiment)

Figure 10:
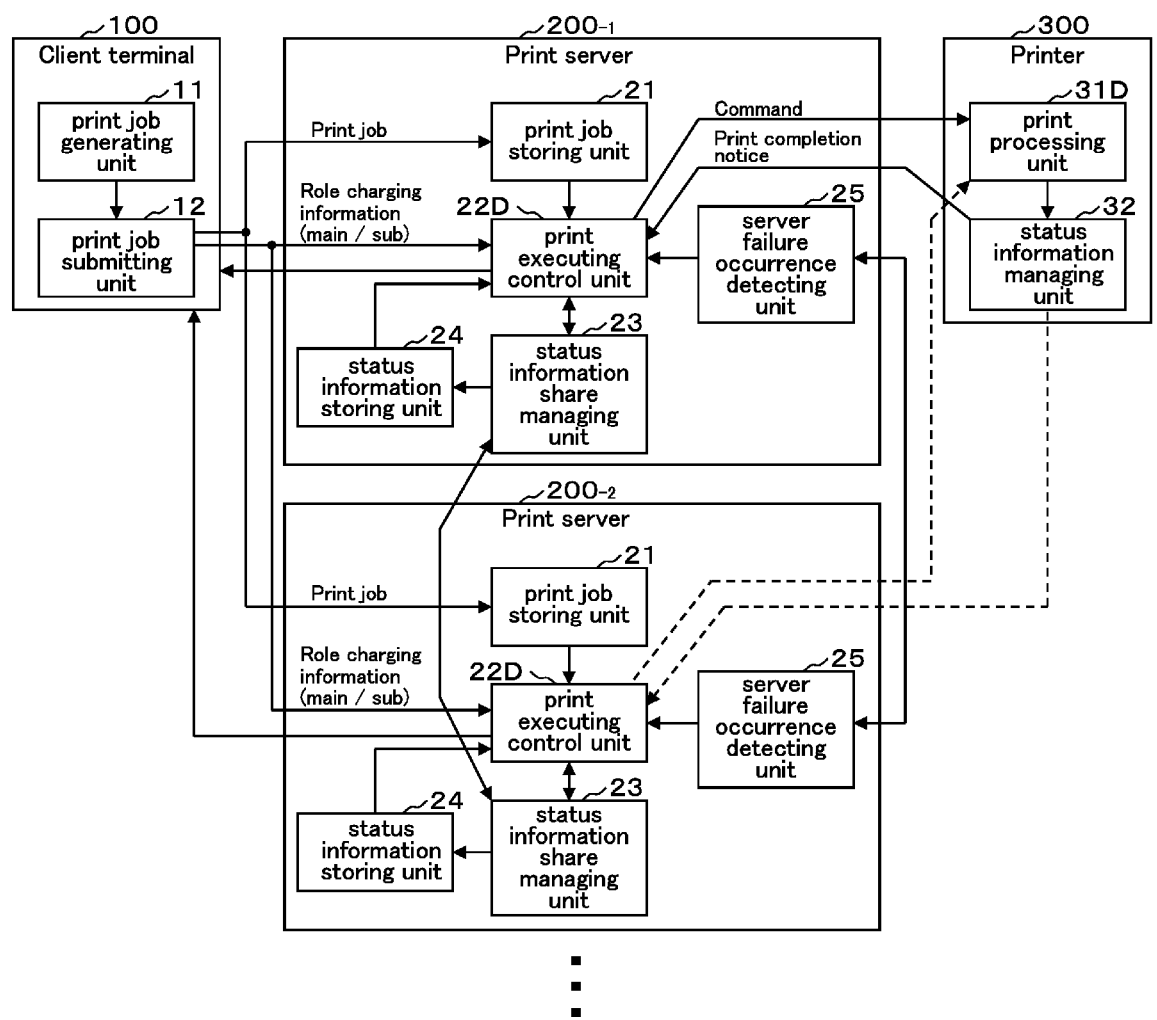
FIG. 10 is a diagram showing an example of a functional structure of a printing system according to a fifth embodiment.

Next, a fifth embodiment of the present invention will be described with reference to the drawings. A whole structure of a printing system according to the fifth embodiment is the same as that in FIG. 1. FIG. 10 is a block diagram showing an example of a functional structure of the printing system according to the fifth embodiment. In FIG. 10, components having the same reference numerals as those shown in FIG. 8 have the same functions, and repetitive description will be therefore omitted.

As shown in FIG. 10, a print server 200 includes, as a functional structure thereof, a print executing control unit 22D in place of the print executing control unit 22C shown in FIG. 8. Moreover, a printer 300 includes, as a functional structure thereof, a print processing unit 31D in place of the print processing unit 31B shown in FIG. 8.

The print executing control unit 22D of the print server 200 gives the printer 300 an instruction for executing print based on a print job stored in a print job storing unit 21, and acquires status information from the printer 300 every predetermined timing. Each predetermined timing is the same as that described in the third embodiment. Description will be given to an example in which the printer 300 transmits the status information in response to an inquiry sent from the print server 200 every predetermined time. In the fifth embodiment, also in the print server $200_{-2}$ taking the sub charge as well as the print server $200_{-1}$ taking the main charge, the print executing control unit 22D transmits a print job for all pages to the printer 300 and gives an instruction for executing the print.

When the print jobs for all pages are transmitted from the two print servers $200_{-1}$ and $200_{-2}$ respectively, the print processing unit 31D of the printer 300 executes the print from a first page based on one of the print jobs. Although the print job to be employed herein may be sent from either of the print servers $200_{-1}$ and $200_{-2}$, it is assumed that the print is executed based on the print job sent from the print server $200_{-1}$ taking the main charge, for example. The print executing control unit 22D adds role charging information to the print job and transmits them to enable identification as to which of the print jobs takes the main charge, for example.

If a failure occurs in the print server $200_{-1}$ taking the main charge before the receipt of the print job is completed in the printer 300, the receipt of the print job sent from the print server $200_{-1}$ taking the main charge is interrupted. In this case, the print processing unit 31D executes the print from a succeeding page based on another print job which is being received simultaneously from the print server $200_{-2}$ taking the sub charge.

In the print server $200_{-1}$ taking the main charge, the print executing control unit 22D makes an inquiry about status information for the printer 300 every predetermined time. The status information managing unit 32 transmits the status information stored in the internal memory to the print server $200_{-1}$ taking the main charge as a response to the inquiry. The status information share managing unit 23 of the print server $200_{-1}$ taking the main charge generates the status information indicating which pages have been completely printed based on the status information acquired every predetermined time from the printer 300 by the print executing control unit 22D, and stores the status information in the status information storing unit 24 and shares the status information with the print server $200_{-2}$ taking the sub charge, and furthermore, gives a notice to the client terminal 100.

On the other hand, in the print server $200_{-2}$ taking the sub charge, the print executing control unit 22D does not make the inquiry about the status information for the printer 300 in principle. In the case in which the occurrence of the failure in the print server $200_{-1}$ taking the main charge is detected by the server failure occurrence detecting unit 25, the print executing control unit 22D makes the inquiry about the status information for the printer 300 in the print server $200_{-2}$ taking the sub charge.

In other words, when the occurrence of the failure in the print server $200_{-1}$ taking the main charge is detected by the server failure occurrence detecting unit 25, the print executing control unit 22D of the print server $200_{-2}$ taking the sub charge makes an inquiry about the status information for the printer 300 every predetermined time and acquires the status information from the printer 300 as a response thereto. Then, the status information share managing unit 23 of the print server $200_{-2}$ taking the sub charge generates the status information indicating which pages have been completely printed based on the status information acquired every predetermined time from the printer 300 and stores the status information in the status information storing unit 24, and furthermore, gives a notice to the client terminal 100.

Figure 11:
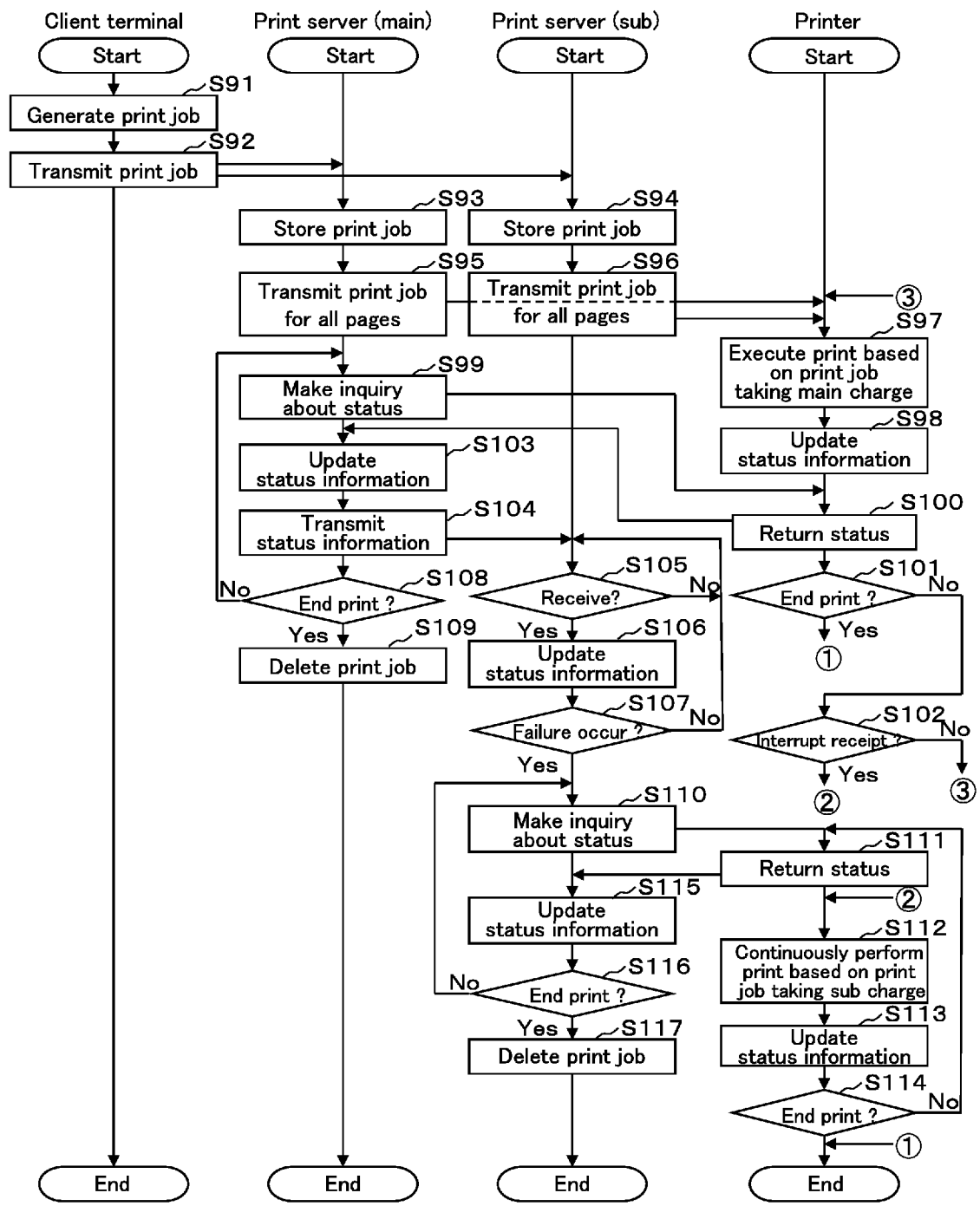
FIG. 11 is a flowchart showing an example of an operation of the printing system according to the fifth embodiment.

FIG. 11 is a flowchart showing an example of an operation of the printing system according to the fifth embodiment having the structure described above. The flowchart shown in FIG. 11 is started when an instruction for executing print is given in the client terminal 100. First of all, the print job generating unit 11 of the client terminal 100 generates a print job in accordance with a print instruction given from the user (Step S91).

Then, the print job submitting unit 12 specifies the two print servers $200_{-1}$ and $200_{-2}$ as the main charge and the sub charge from the n print servers 200 and submits the print job generated by the print job generating unit 11 into the two print servers $200_{-1}$ and $200_{-2}$ thus specified (Step S92). At this time, the print job submitting unit 12 transmits, to the print servers $200_{-1}$ and $200_{-2}$, assignment charging information indicating which one takes the main charge or the sub charge.

In each of the two print servers $200_{-1}$ and $200_{-2}$, the print job storing unit 21 stores the print job submitted by the print job submitting unit 12 of the client terminal 100 (Steps S93 and S94). Next, the print executing control units 22D of the two print servers $200_{-1}$ and $200_{-2}$ transmit, to the printer 300, the print job for all pages stored in the print job storing unit 21, thereby giving an instruction for executing the print (Steps S95 and S96).

The print processing unit 31D of the printer 300 executes the print from a first page while receiving the print job sent from the print server $200_{-1}$ taking the main charge (Step S97). Moreover, the status information managing unit 32 generates status information indicating which pages have been completely printed and stores the status information in the internal memory (Step S98).

In the print server $200_{-1}$ taking the main charge, after the transmission of the print job is started in the Step S95, an inquiry about the status information is made for the printer 300 in such a timing that a predetermined time passes (Step S99). The status information managing unit 32 of the printer 300 returns the status information stored in the internal memory to the printer server $200_{-1}$ taking the main change in response to the inquiry (Step S100).

Herein, the print processing unit 31D decides whether the print for the all pages through the print job sent from the print servers $200_{-1}$ taking the main charge is ended or not (Step S101). If the print for the all pages is ended, the processing of the flowchart shown in FIG. 11 is ended. On the other hand, if the print for the all pages has not been ended yet, the print processing unit 31D decides whether the receipt of the print job sent from the print server $200_{-1}$ taking the main charge is interrupted or not (Step S102). Herein, if the receipt of the print job is not interrupted, the processing returns to the Step S97 in which the print is continuously performed. On the other hand, if the receipt of the print job sent from the print server $200_{-1}$ taking the main charge is interrupted, the processing makes a transition to Step S112.

In the print server $200_{-1}$ taking the main charge, after the print executing control unit 22D makes an inquiry for the printer 300 in the Step S99, when a notice of the status information is received from the printer 300, the status information share managing unit 23 generates status information indicating which pages have been completely printed and stores the status information in the status information storing unit 24 of the print server $200_{-1}$ itself (Step S103). Moreover, the status information share managing unit 23 transmits the generated status information to the print server $200_{-2}$ taking the sub charge (Step S104).

In the print server $200_{-2}$ taking the sub charge, the status information share managing unit 23 decides whether the status information is received from the print server $200_{-1}$ taking the main charge (Step S105). If the status information is received, the status information share managing unit 23 stores it in the status information storing unit 24 of the print server $200_{-2}$ itself (Step S106). Then, the server failure occurrence detecting unit 25 of the print server $200_{-2}$ taking the sub charge decides whether a failure occurs in the print server $200_{-1}$ taking the main charge or not (Step S107). If the failure does not occur, the processing returns to the Step S105.

On the other hand, in the print server $200_{-1}$ taking the main charge, after the status information share managing unit 23 transmits the status information to the print server $200_{-2}$ taking the sub charge in the Step S104, the print executing control unit 22D decides whether the print for the all pages through the print job transmitted to the printer 300 in the Step S95 is ended or not based on the status information stored in the status information storing unit 24 (Step S108). If the print for the all pages has not been ended yet, the processing returns to the Step S99 in which the inquiry for the status information is made again in such a timing that a predetermined time further passes.

On the other hand, if it is decided that the print for the all pages is ended, the print executing control unit 22D deletes the print job from the print job storing unit 21 (Step S109) and the processing of the flowchart shown in FIG. 11 is ended. If it is decided that the print for the all pages is ended based on the status information stored in the status information storing unit 24 also in the print server $200_{-2}$ taking the sub charge, the print executing control unit 22D deletes the print job from the print job storing unit 21, which is not shown in FIG. 11.

In contrast, in the Step S107, if the server failure occurrence detecting unit 25 decides that a failure occurs in the print server $200_{-1}$ taking the main charge, an inquire about status information is made for the printer 300 in such a timing that a predetermined time passes in the print server $200_{-2}$ taking the sub charge (Step S110). The status information managing unit 32 of the printer 300 returns the status information stored in the internal memory to a print server $200_{-2}$ taking the sub charge in response to the inquiry (Step S111).

Then, the print processing unit 31D of the printer 300 continuously performs print from a next page to a page in the interruption of the receipt of the print job sent from the print server $200_{-1}$ taking the main charge in accordance with the print job sent from the print server $200_{-2}$ taking the sub charge in the Step S96 (Step S112). Moreover, the status information managing unit 32 generates status information indicating which pages have been completely printed and stores the status information in the internal memory (Step S113).

Herein, the print processing unit 31D decides whether the print for the all pages through the print job sent from the print server $200_{-2}$ taking the sub charge is ended or not (Step S114). If the print for the all pages is ended, the processing of the flowchart shown in FIG. 11 is ended. On the other hand, if the print for the all pages has not been ended yet, the processing returns to the Step S111.

In the print server $200_{-2}$ taking the sub charge, after the print executing control unit 22D makes an inquiry for the printer 300 in the Step S110, when a notice of the status information is received from the printer 300, the status information share managing unit 23 generates status information indicating which pages have been completely printed and stores the status information in the status information storing unit 24 of the print server $200_{-2}$ itself (Step S115). Then, the print executing control unit 22D decides whether the print for the all pages through the print job transmitted to the printer 300 in the Step S96 is ended or not based on the status information stored in the status information storing unit 24 (Step S116).

If the print for the all pages has not been ended yet, the processing returns to the Step S110 and an inquiry about the status information is made again in such a timing that a predetermined time further passes. On the other hand, if it is decided that the print for the all pages is ended, the print executing control unit 22D deletes the print job from the print job storing unit 21 (Step S117) and the processing of the flowchart shown in FIG. 11 is ended.

As described above in detail, in the fifth embodiment, the print job generated in the client terminal 100 is submitted into the two print servers $200_{-1}$ and $200_{-2}$, and the print jobs for all pages are transmitted from the two print servers $200_{-1}$ and $200_{-2}$ to the printer 300 to give an instruction for executing the print. At this time, the print processing unit 31D of the printer 300 executes the print from a first page in accordance with a print job sent from the print server $200_{-1}$ taking the main charge while receiving the print job.

When a failure occurs in the print server $200_{-1}$ taking the main charge which is executing the print (during transmission of the print job) and the receipt of the print job from the print server $200_{-1}$ taking the main charge is interrupted in the printer 300, thereafter, the print processing unit 31D continuously performs the print from a succeeding page to the interrupted page in accordance with the print job which is being simultaneously received from the print server $200_{-2}$ taking the sub charge.

According to the fifth embodiment having such a structure, even if the failure occurs in the print server $200_{-1}$ taking the main charge which is transmitting the print job, the print job sent from the print server $200_{-2}$ taking the sub charge continuously reaches the printer 300. Therefore, it is possible to continuously perform the print in the printer 300.

Thus, it is not necessary to reconfigure the print job when the failure occurs in the print server $200_{-1}$ taking the main charge and to discard (skip) a page at the printer 300 side. Consequently, it is possible to continuously perform the print without stoppage and to avoid double printing.

Although the description has been given to the example in which the client terminal 100 determines a print job submitting destination in the first to fifth embodiments, the present invention is not restricted thereto. For example, a terminal for monitoring a load situation of the print server 200 may be provided between the client terminal 100 and n print servers 200 to determine the print job submitting destination in the terminal.

Although the description has been given to the example where which one of the printers 300 is to be used is designated simultaneously when the instruction for executing the print is given by the client terminal 100 in the second embodiment, moreover, the present invention is not restricted thereto. For example, when the instruction for executing the print is started to be given, the printer 300 which has not executed the print may be specified to give the instruction for executing the print at that time.

Although the description has been given to the example in which only the print server 200 is clustered in the third to fifth embodiments, moreover, it is also possible to further cluster the printer 300 in the same manner as in the second embodiment. Although the description has been given to the example in which the status information of the print acquired by making an inquiry for the printer 300 is shared by the two print servers $200_{-1}$ and $200_{-2}$ in the fifth embodiment, furthermore, it is not indispensable to share the status information.

In addition, the first to fifth embodiments are only illustrative for concreteness to carry out the present invention and the technical scope of the present invention should not be thereby construed to be restrictive. In other words, the present invention can be carried out in various configurations without departing from the gist or main features thereof.

EXPLANATION OF DESIGNATION 12 print job submitting unit
22, 22A, 22B, 22C, 22D print executing control unit
23, 23A status information share managing unit
24 status information storing unit
25 server failure occurrence detecting unit
26 printer failure occurrence detecting unit
31, 31B, 31D print processing unit
32 status information managing unit
100 client terminal
200 print server
300 printer

The invention claimed is:
1. A printing system in a cluster environment having a plurality of print servers, the printing system comprising:
a print job submitting unit for submitting a print job generated in a client terminal into at least two of the print servers;
a print executing control unit for sequentially giving a printer instructions for executing print for respective pages in accordance with respective commands based on the print job and receiving print completion notices for respective pages from the printer in a print server into which the print job is submitted by the print job submitting unit;

a status information share managing unit for generating status information indicating which pages have been completely printed based on the print completion notice received from the printer by the print executing control unit and storing the status information in storing units of the at least two print servers, respectively; and a server failure occurrence detecting unit for detecting occurrence of a failure in the print server, wherein the print executing control unit sequentially gives the printer instructions for executing print from a first page in one of the at least two print servers into which the print job is submitted by the print job submitting unit, and when the occurrence of the failure in the one print server is detected by the server failure occurrence detecting unit, the print executing control unit sequentially gives the printer instructions for executing print from a next unprinted page to a page indicated to be completely printed through the status information stored in the storing unit based on the print job which has been submitted by the print job submitting unit in another print server from the print server having the failure occurrence in the at least two print servers;

a printer failure occurrence detecting unit for detecting occurrence of a failure in the printer, wherein the print executing control unit sequentially gives one of the printers instructions for executing print from a first page in one of the at least two print servers into which the print job is submitted by the print job submitting unit, and when the occurrence of the failure in the one printer is detected by the printer failure occurrence detecting unit, the print executing control unit in the one print server sequentially gives instructions for executing print from a next unprinted page to a page indicated to be completely printed through the status information stored in the storing unit for the another printer from any of the printers which has the failure occurrence;

wherein the status information share managing unit generates status information indicating which printer is used and which pages have been completely printed based on a print completion notice received from the printer and stores the status information in the storing units of the print servers, respectively, and the print executing control unit sequentially gives instructions for executing print from a next unprinted page to a page indicated to be completely printed through the status information stored in the storing unit to another one of the printers from the printer having the failure occurrence which is a printer other than the printer indicated to be executing the print through the status information stored in the storing unit.

2. A printing system in a cluster environment having a plurality of print servers, the printing system comprising:

a print job submitting unit for submitting a print job generated in a client terminal into at least two of the print servers; and a print executing control unit for giving a printer an instruction for executing print through a print job for all pages from the at least two print servers into which the print job is submitted by the print job submitting unit, wherein the printer includes a print processing unit for executing print from a first page based on one of the print job for all pages when the print jobs for all pages are sent from the at least two print servers, and for executing the print from a succeeding page based on another print job which is being received when receipt of the one print job is interrupted before the receipt of the print job is completed.

3. A print control method of controlling execution of print in a printing system in a cluster environment having a plurality of print servers, the method comprising:

a first step of submitting a print job generated in a client terminal into at least two of the print servers by a print job submitting unit of the client terminal;

a second step of giving a printer an instruction for executing print through a print job for all pages by print executing control units of the at least two print servers;

a third step of executing print from a first page based on the print job for all pages by a print processing unit of the printer when the print job for all pages is sent from the at least two print servers; and a fourth step of executing print from a succeeding page base on another print job which is being received by the print processing unit of the printer when receipt of one of the print jobs is interrupted before the receipt of the print job is completed.

4. A printing control program stored on a non-transitory computer-readable medium to be executed in a plurality of print servers and a printer in a printing system in a cluster environment having the print servers, the printing control program to be executed in the print servers causing a computer of the print servers to function as:

print executing control means for giving the printer an instruction for executing print based on a print job submitted from a client terminal, wherein the print executing control means of at least two of the print servers in which the print job is submitted from the client gives the printer an instruction for executing print through a print job for all pages, respectively, and the printing control program to be executed in the printer causes the computer of the printer to function as:

print processing means for executing print from a first page based on one of the print jobs when the print jobs for all pages are sent from the at least two print servers, and for executing the print from a succeeding page based on another print job which is being received when receipt of the print job is interrupted before receipt of the one of the print jobs is completed.

* * * * *